United States Patent [19]

Tajima et al.

[11] Patent Number: 5,417,619
[45] Date of Patent: May 23, 1995

[54] CANVAS-RUBBER COMPLEX, V-RIBBED BELT USING IT AND METHOD OF PRODUCING V-RIBBED BELT

[75] Inventors: Yoshitaka Tajima; Masaaki Ogino; Yuji Takahara; Shizuaki Tsuruta; Kanji Kimoto; Kazuyoshi Tani, all of Kobe, Japan

[73] Assignee: Bando Chemical Industries, Ltd., Kobe, Japan

[21] Appl. No.: 238,691

[22] Filed: May 5, 1994

[30] Foreign Application Priority Data

May 11, 1993 [JP] Japan .................... 5-108982

[51] Int. Cl.⁶ .................................................. F16G 1/00
[52] U.S. Cl. ........................................................ 474/260
[58] Field of Search .................................... 474/260–268

[56] References Cited

U.S. PATENT DOCUMENTS

| | | |
|---|---|---|
| 3,563,103 | 2/1971 | Sauer . |
| 4,031,761 | 6/1977 | Fisher et al. . |
| 4,642,082 | 2/1987 | Mashimo et al. ........... 474/260 |
| 5,120,280 | 6/1992 | Mizuno et al. ........... 474/260 |
| 5,232,400 | 8/1993 | Kanamori et al. ........... 474/260 |

FOREIGN PATENT DOCUMENTS

| | | |
|---|---|---|
| 0198308 | 10/1986 | European Pat. Off. . |
| 2715199 | 10/1977 | Germany . |
| 61-136036 | 6/1986 | Japan . |
| 2003724 | 1/1990 | Japan . |

Primary Examiner—Michael Powell Buiz
Attorney, Agent, or Firm—Sixbey, Friedman, Leedom & Ferguson; Gerald J. Ferguson, Jr.

[57] ABSTRACT

A canvas-rubber complex provided on an upper face of a tension rubber on a back side of V-ribbed belt is composed of a covering canvas, impregnation rubber with which the covering canvas is impregnated, an outer rubber layer which is applied to a first face of the covering canvas which is located on the back face's side of the belt, an inner rubber layer which is applied to a second face of the covering canvas which is the back of the first face, and an adhesion rubber layer disposed on a side of the inner rubber layer for adhering the canvas-rubber complex to the upper face of the tension rubber. Among the rubber elements excepting the adhesion rubber layer, at least the outer rubber layer is formed of a rubber composition including as main ingredients thereof CR polymer, hard carbon and conductive carbon.

9 Claims, 4 Drawing Sheets

CANVAS-RUBBER COMPLEX, V-RIBBED BELT USING IT AND METHOD OF PRODUCING V-RIBBED BELT

BACKGROUND OF THE INVENTION

This invention relates to a canvas-rubber complex, a V-ribbed belt using it and a method of producing a V-ribbed belt. As for the V-ribbed belt, in particular, it relates to a V-ribbed belt suitably used as an auxiliary driving belt for driving an auxiliary for automobile which is driven by an engine such as a generator, a cooling fan, an oil pump, in such a manner as to take a driving power from the back of the belt.

Conventionally, the V-ribbed belt has both of flexibility as in a flat belt and high transmissibility as in a V-belt. For this reason, the V-ribbed belt has been widely used as an suitable belt for driving an auxiliary for automobile. The V-ribbed belt is composed of, for example, a tension rubber located on the belt back side, a compression rubber located inside of the belt, and tension members which are arranged between the tension rubber and the compression rubber and extend in a longitudinal direction of the belt. A plurality of grooves in the form of V in section are continuously formed at the compression rubber in the longitudinal direction of the belt. An upper surface of the tension rubber which serves as the belt back is covered with a covering canvas.

Both faces of the covering canvas are coated with rubber or subjected to RFL (resorcin formaldehyde latex) adhesion treatment. In detail, for example, one face of the covering canvas is coated with a rubber composition based on a compounding example including ingredients as shown in Table 1 (conventional compounding example) by frictioning according to a calender and successively, another face of the covering canvas is coated by the same manner. In this case, the weight of rubber coated on the canvas is in a range from about 230 to 300 g/m² as both faces of the covering canvas. The rubber is provided so as to be deposited on the face of the covering canvas which is located on the back face's side of the V-ribbed belt at the rate of 70 to 80% thereof and on the other face of the covering canvas at tile remaining rate of 30 to 20%, respectively.

TABLE 1

| (conventional compounding example) | |
| --- | --- |
| CR polymer | 100 parts by weight |
| FEF carbon (carbon black) | 40 parts by weight |
| Plasticizer | 5 parts by weight |
| tackifier | 3 parts by weight |
| process oil | 15 parts by weight |
| stearic acid | 1 parts by weight |
| zinc oxide | 5 parts by weight |
| magnesium oxide | 5 parts by weight |
| vulcanization accelerator | 0.5 parts by weight |
| antioxidant | 3 parts by weight |
| total | 170 parts by weight |

At the use for driving an auxiliary for automobile, the V-ribbed belt is trained between a crank pulley of the automobile engine and a pulley provided at the auxiliary so as to contact outer peripheries of the respective pulleys at the inner surface of the belt. In recent years, the belt is often used so as to contact a flat pulley at the back of the belt, in order to transmit a sufficient driving force to the auxiliary pulley by increasing a contact angle (bending angle) of the belt with respect to the auxiliary pulley when the belt is wrapped around the auxiliary pulley, or in order to prevent the contact of tile belt with engine elements for consideration for a layout of the engine elements.

According to the above conventional V-ribbed belt, the rubber does not permeate inside of weft and warp yarns forming the covering canvas because the method of depositing the rubber on both of the faces of the covering canvas is a frictioning method according to a calender. In addition, the rubber composition is so compounded that the rubber to be obtained is flexible, in order that the rubber is readily rubbed on the faces of the covering canvas. Resulting from these, the conventional V-ribbed belt has inferior abrasion resistance in its belt back.

As described above, when power transmission is made in such a manner that the flat pulley is arranged on the back face's side of the V-ribbed belt to be trained between two shafts, the rubber or the adherent by the RFL adhesion treatment, which is coated on the face of the covering canvas as the belt back, is readily abraded owing to slips occurring at the contact of the belt back with the flat pulley, so that particles of the rubber or the adherent, which are rubbed out in the form of powders because of the abrasion, gradually stick to the pulleys. Because of a state that the rubbed particles of the rubber or the like stick to the pulleys, peeling sound is generated between the flat pulley and the belt when the belt moves away from the flat pulley after they contact each other. Further, because the rubbed-out particles stick to the flat pulley in the form of balls, there is generated sounds that the belt beats the flat pulley at the contact of the belt with the flat pulley. Thus, the conventional V-ribbed belt disadvantageously generates undesirable sounds.

It is understood that the above-mentioned low abrasion resistance of the belt back, i.e., a rubber layer coated on the face of the covering canvas, against the contact with the flat pulley, results from abrasion resistance of the rubber composition applied to the covering canvas. Further, it is understood that the stick of the rubbed-out particles to the pulley results from that the process oil used for the improvement of workability of the rubber composition to be coated on the covering canvas gradually bleeds from the belt back and the bled process oil is mixed with the rubbed-out particles of the rubber or the like.

In view of the foregoing problems, the present invention has its object of, by applying a rubber composition having abrasion resistance and conductivity to a first face of a covering canvas which is located on the back face's side of a V-ribbed belt and using a rubber composition compounded so as to perform good workability without process oil, restricting abrasion of the rubber layer of the belt back at the contact with a flat pulley thereby preventing generation of peeling sounds when the belt moves away from the flat pulley and beating sounds that the belt beats the flat pulley at the contact with the flat pulley.

SUMMARY OF THE INVENTION

To attain the foregoing object, in this invention, at least one rubber layer disposed on a first face of a covering canvas which is located on the back face's side of a V-ribbed belt among a rubber complex combined with the covering canvas for covering the back of the V-ribbed belt, is composed of a rubber composition which has excellent abrasion resistance and conductivity and which can be coated by spreading without process oil.

In detail, this invention premises a canvas-rubber complex and also premises a V-ribbed belt having: a tension rubber; a compression rubber; and tension members which are arranged therebetween so as to extend in a longitudinal direction of the belt and fixed by adhesion rubber, wherein the compression rubber has a plurality of grooves in the form of V in section which extend in the longitudinal direction of the belt and the tension rubber is covered at an upper face thereof with the canvas-rubber complex.

The canvas-rubber complex comprises: a covering canvas; impregnation rubber with which the covering canvas is impregnated; an outer rubber layer which is applied to a first face of the covering canvas which is located on the back face's side of a V-ribbed belt; an inner rubber layer which is applied to a second face of the covering canvas which is the back of the first face; and an adhesion rubber layer provide on the inner rubber layer for adhering the canvas-rubber complex to an upper face of the tension rubber. Further, among the rubber elements excepting the adhesion rubber layer in the canvas-rubber complex, at least the outer rubber layer is formed of a rubber composition having high abrasion resistance and high conductivity.

For example, the outer rubber layer in the canvas-rubber complex is formed of a rubber composition including as main ingredients thereof CR polymer (chloroprene rubber polymer), hard carbon and conductive carbon.

In the canvas-rubber complex, each of the outer rubber layer, inner rubber layer and impregnation rubber may be formed of a rubber composition including as main ingredients thereof CR polymer, hard carbon and conductive carbon and the adhesion rubber layer may be formed of a rubber composition as main ingredients thereof CR polymer, soft carbon and silicate filler.

In producing the V-ribbed belt having the above structure, the covering canvas is first immersed into rubber cement which is so formed that a rubber composition including as main ingredients thereof CR polymer, hard carbon and conductive carbon is dissolved in organic solvent, thereby impregnating the covering canvas with the rubber composition. Next, the same rubber cement as the above is applied to the first and second faces of the covering canvas to form an outer rubber layer and an inner rubber layer. Further, the rubber cement so formed that a rubber composition including as main ingredients thereof CR polymer, soft carbon and silicate filler is dissolved in organic solvent is applied to the outer rubber layer to form the adhesion rubber layer. Thus, the canvas-rubber complex is produced. Then, the canvas-rubber complex thus obtained is adhered to the tension rubber through the adhesion rubber layer by vulcanization.

In the canvas-rubber complex, the outer rubber layer may be formed of a rubber composition including main ingredients thereof CR polymer, hard carbon and conductive carbon, the impregnation rubber may be formed of a rubber composition including as main ingredients thereof CR polymer and silicate filler, and the inner rubber layer and adhesion rubber layer may be each formed of a rubber composition including as main ingredients thereof CR polymer, soft carbon and silicate filler.

In this case, preferably, the weight of the impregnation rubber is in a range from 32 to 64 g/m², the weight of the outer rubber layer is in a range from 16 to 48 g/m², and the total weight of the inner rubber layer and adhesion rubber layer is in a range from 112 to 176 g/m².

In producing the V-ribbed belt of this case, the covering canvas is first immersed into rubber cement so formed that a rubber composition including as main ingredients thereof CR polymer and silicate filler is dissolved in organic solvent, so that the covering canvas is impregnated with the rubber composition. Then, rubber cement so formed that a rubber composition including as main ingredients thereof CR polymer, hard carbon and conductive carbon is dissolved in organic solvent is applied to the first face of the covering canvas which is located on the back face's side of the V-ribbed belt, thereby forming the outer rubber layer. Further, rubber cement so formed that a rubber composition including as main ingredients thereof CR polymer, soft carbon and silicate filler is dissolved in organic solvent is applied to the back of the covering canvas to form the inner rubber layer and adhesion rubber layer. Thus, the canvas-rubber complex is produced. Then, the canvas-rubber complex is adhered to the tension rubber through the adhesion rubber layer by vulcanization.

As described above, the outer rubber layer of the canvas-rubber complex located on the back face's side of the V-ribbed belt is formed of a rubber composition having excellent abrasion resistance and conductivity (rubber composition including as main ingredients thereof CR polymer, hard carbon and conductive carbon). Accordingly, the V-ribbed belt is difficult to slip on the flat pulley, even when belt transmission is made in such a manner that the belt is trained between two shafts and the flat pulley is arranged on the back face's side of the belt. Further, even if the belt back slips on the flat pulley, the outer rubber layer is difficult to abrade.

Furthermore, since the rubber composition forming the inner rubber layer includes no process oil, even when belt abrasion generates, rubbed-out rubber particles do not stick to the pulley. Accordingly, no peeling sound generates when the belt moves away from the pulley. Moreover, since rubbed-out rubber particles do not become adhesives, the particles is prevented from sticking to the flat pulley. This prevents generation of beating sound that the belt beats the pulley.

In particular, when the adhesion rubber layer of the canvas-rubber complex is formed of a rubber composition including as main ingredients thereof CR polymer, soft carbon and silicate filler, adhesive strength of the rubber composition is increased because of mixture of the silicate filler, thereby increasing adhesive strength between the adhesion rubber layer and the tension rubber of the V-ribbed belt. Accordingly, peeling between the layers is difficult to generate after time has passed, thereby enhancing endurance of the belt.

PREFERRED EMBODIMENTS

Description is made below about embodiments of this invention with reference to the drawings.

Figure 1:
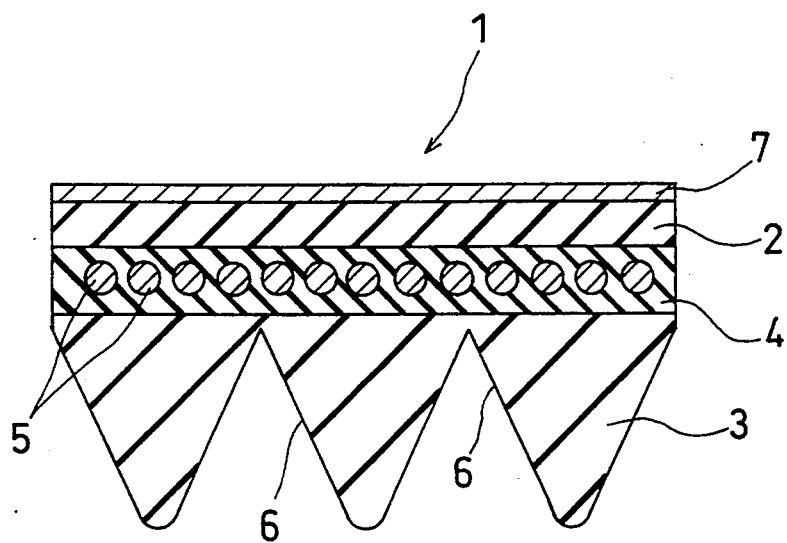
FIG. 1 is a sectional view showing an embodiment of a V-ribbed belt of this invention.

FIG. 1 shows an embodiment of a V-ribbed belt 1 of this invention. The V-ribbed belt 1 comprises: a tension rubber 2, a compression rubber 8, tension members 5 which are arranged between the tension rubber 2 and the compression rubber 3 so as to extend in a longitudinal direction of the belt and fixed to the rubbers 2, 3 through adhesion rubber 4. The compression rubber 3 has a plurality of V-grooves 6, 6 ... in the form of V in section which extend in a longitudinal direction of the belt 1. An upper surface of the tension rubber 2 is covered with a canvas-rubber complex 7.

Figure 2:
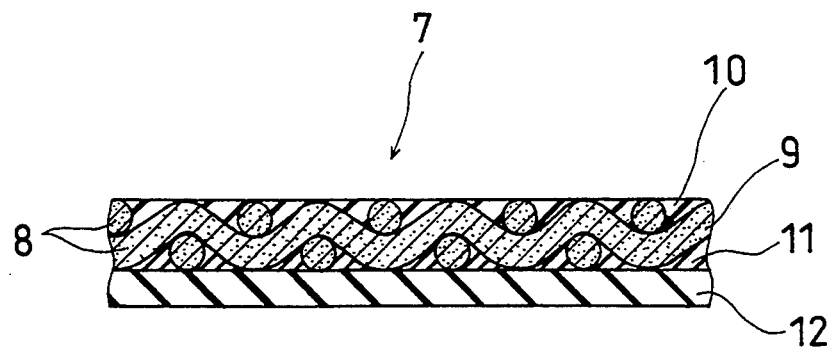
FIG. 2 is an enlarged sectional view of a canvas-rubber complex used for the above V-ribbed belt.

This invention has its feature in the canvas-rubber complex 7 of the V-ribbed belt 1 arranged as in the above. In detail, as shown in FIG. 2, the canvas-rubber complex 7 is composed of a covering canvas 8, impregnation rubber 9 with which the covering canvas 8 is impregnated, an outer rubber layer 10 applied to a first face of the covering canvas 8 which is located at the back face's side of the V-ribbed belt, an inner rubber layer 11 applied to a second face of the covering canvas 8 which is the back of the first face, and an adhesion rubber layer 12 applied to the inner rubber layer 11. The outer rubber layer 10 and the inner rubber layer 11 are applied to the covering canvas 8 in order to fill the texture of the covering canvas 8.

A fabric having high strength such as a cotton fabric is used for the covering canvas 8.

Further, among the impregnation rubber 9, the outer rubber layer 10 and the inner rubber layer 11, at least the outer rubber layer 10 is formed of a rubber composition having excellent abrasion resistance and conductivity (e.g., a compounding example B shown in Table 3). Furthermore, the adhesion rubber layer 12 is formed of a rubber composition such as a compounding example A shown in Table 2 so as to be rigidly adhered by vulcanization to the upper surface of the tension rubber 2 of the V-ribbed belt.

TABLE 2

| (compounding example A) | |
|---|---|
| CR polymer | 100 parts by weight |
| FEF carbon (as soft carbon) | 20 parts by weight |
| silicate filler | 30 parts by weight |
| magnesium oxide | 5 parts by weight |
| stearic acid | 1 parts by weight |
| processing adjutant | 3 parts by weight |
| antioxidant | 4 parts by weight |
| vulcanization accelerator | 2 parts by weight |
| vulcanizing agent | 5 parts by weight |
| total | 170 parts by weight |

TABLE 3

| (compounding example B) | |
|---|---|
| CR polymer | 100 parts by weight |
| HAF carbon (as hard carbon) | 10 to 20 parts by weight |
| conductive carbon | 30 to 40 parts by weight |
| plasticizer | 5 parts by weight |
| stearic acid | 1 parts by weight |
| magnesium oxide | 5 parts by weight |
| processing adjutant | 3 parts by weight |
| antioxidant | 4 parts by weight |
| vulcanization accelerator | 0.2 parts by weight |
| vulcanizing agent | 5 parts by weight |
| total | 163.2 to 183.2 parts by weight |

Each weight of rubber calculated on the basis of the areas of the impregnation rubber 9, the outer rubber layer 10, the inner rubber layer 11 and the adhesion rubber layer 12 is a factor on which abrasion of the belt back and generation of sounds at the use of the belt are dependent. As for the impregnation rubber 9, a rubber composition having ingredients as in the compounding example B or a compounding example C of Table 4 is dissolved in organic solvent such as toluene so as to form rubber cement. The covering canvas 8 is immersed into the rubber cement and then squeezed. Thus, the covering canvas 8 is impregnated to the inside of the weft and warp yarns forming the covering canvas 8 with the rubber composition in order that its weight of the impregnation rubber 9 calculated on the basis of the area is in a range from 32 to 64 $g/m^2$.

In case that the weight of the impregnation rubber 9 is less than 32 $g/m^2$, adhesive property is lowered between the rubber and the covering canvas 8. As a result, not only the rubber cannot be sufficiently permeated inside the weft and warp yarns forming the covering canvas 8, but also influence of such as water cannot be avoided. On the contrary, in case that the weight is more than 64 $g/m^2$, this affects the thickness of the covering canvas 8 thereby affecting the weight of rubber calculated on the basis of the areas of the outer rubber layer 10 and the inner rubber layer 11. Therefore, the weight of the impregnation rubber 9 is preferably in a range from 32 to 64 $g/m^2$.

TABLE 4

| (compounding example C) | |
|---|---|
| CR polymer | 100 parts by weight |
| FEF carbon (as soft carbon) | 5 parts by weight |
| silicate filler | 25 parts by weight |
| magnesium oxide | 7 parts by weight |
| stearic acid | 1.5 parts by weight |
| processing adjutant | 3 parts by weight |
| antioxidant | 6 parts by weight |
| vulcanization accelerator | 2 parts by weight |
| vulcanizing agent | 10 parts by weight |
| total | 159.5 parts by weight |

As for the outer rubber layer 10, rubber cement so formed that a rubber composition shown in the compounding example B is dissolved in organic solvent is applied, by spreading, to the first face of the covering canvas 8 subjected to the above impregnation treatment so that its weight of the outer rubber layer 10 calculated on the basis of the area is in a range from 16 to 48 $g/m^2$.

In case that the weight of the outer rubber layer 10 is less than 16 $g/m^2$, electric resistance thereof is increased and the effect of filling the texture of the covering canvas 8 is decreased so that printability of marks to be printed on the belt back is lowered. On the contrary, in case that the weight is more than 48 $g/m^2$, abrasion readily generates. For the above reason, the weight of the outer rubber layer 10 is preferably set to a range from 16 to 48 $g/m^2$.

As for the inner rubber layer 11 and the adhesion rubber layer 12, a rubber composition of the compounding example B for the inner rubber layer 11 is applied to the second face of the covering canvas 8 by spreading and then another rubber composition of the compounding example A for the adhesion rubber layer 12 is applied thereto by spreading. Alternatively, for the inner rubber layer 11 and for the adhesion rubber layer 12, a single rubber composition of the compounding example A is applied to the second face of the covering canvas by spreading at a time. At these application, the inner rubber layer 11 and the adhesion rubber layer 12 is so formed that the total weight thereof calculated on the basis of the areas is in a range from 112 to 176 g/m².

In case that the total weight of the inner rubber layer 11 and the adhesion rubber layer 12 is less than 112 g/m², not only sufficient effect of filling the texture of the covering canvas 8 cannot be obtained, but also there cannot be obtained sufficient adhesion effect for fixing the weft and warp yarns of the covering canvas 8 subjected to spreading treatment in order that tile yarns cannot move. On the contrary, in case that the total weight is more than 176 g/m², efficiency of the spreading treatment to be conducted gradually at plural times is lowered. Therefore, the total weight of the inner rubber layer 11 and the adhesion rubber layer 12 is preferably in a range from 112 to 176 g/m².

The V-ribbed belt 1 thus obtained has excellent abrasion resistance in the back thereof, so that the outer rubber layer 10 of the canvas-rubber complex 7 is prevented from being abraded even after the belt is used for a long time. Accordingly, abrasion of rubber and generation of sounds at the belt back are prevented. This leads to smooth belt driving.

Besides the above embodiment, there is another embodiment having the following construction. In this embodiment, as in the first-mentioned embodiment, a fabric having high strength such as a cotton fabric is used for the covering canvas 8, and the outer rubber layer 10 is formed of a rubber composition of the compounding example B.

The impregnation rubber 9 is formed of a rubber composition of a compounding example D shown in Table 5, in which the rubber composition of the compounding example C of Table 4 is mixed with specified adhesives (i.e., an adhesive including as main ingredient thereof resorcin or denatured material thereof and an adhesive including methylene donor as main ingredient thereof). The rubber composition of the compounding example A is used for the inner rubber layer 9 and the adhesion rubber layer 12. The canvas-rubber complex 7 is produced by using the above rubber compositions. As in the first-mentioned embodiment, the canvas-rubber complex 7 is adhered to the upper surface of the tension rubber 2 of the V-ribbed belt 1 by vulcanization to cover the tension rubber 2. Each of the weight calculated on the basis of the areas of the above rubber layers to be formed by impregnation or spreading is the same as in the first-mentioned embodiment.

TABLE 5

| (compounding example D) | |
|---|---|
| milled rubber obtained from compounding example C | 159.5 parts by weight |
| adhesive as its main ingredient resorcin or its denatured material adhesive as its main ingredient | 4 parts by weight |
| methylene donor | 4 parts by weight |
| total | 167.5 parts by weight |

As in the first-mentioned embodiment, the V-ribbed belt 1 obtained in this embodiment has excellent abrasion resistance in the back thereof, so that the outer rubber layer 10 of the canvas-rubber complex 7 is prevented from being abraded even after the belt 1 is used for a long time. Accordingly, stick of rubber to the pulley and generation of sounds of the belt back are prevented. This leads to smooth belt driving.

Further, tile impregnation rubber 9 with which the covering canvas 8 is impregnated is compounded so as to perform excellent adhesive property in particular, thereby further increasing adhesive strength between the outer rubber layer 10 and the covering canvas 8 and adhesive strength between the inner rubber layer 11 and the covering canvas 8. Accordingly, even after the belt 1 is used for a long time, peeling does not generate between the adjacent layers of the belt 1, thereby further increasing durability of the belt 1.

In the compounding example B shown in tile above Table 3, amounts of HAF carbon as high-structure carbon and conductive carbon are limited to 10 to 20 parts by weight and 30 to 40 parts by weight, respectively. The reason for this is that the rubber composition to be obtained is a good conductor and maintains excellent abrasion resistance. Respective ranges of compounding of ItAF carbon and conductive carbon, within which conductivity and abrasion resistance are maintained in good balance, are obtained based on test results shown in the below Tables 6 and 7.

As is evident from test results shown in Table 6, respective V-ribbed belts 1 in which the outer rubber layers 10 are each formed of a CR rubber composition including carbon based on compounding examples Z213 to Z216, are excellent especially in conductivity, as compared with a V-ribbed belt in which another kind of carbon is used or a V-ribbed belt in which an outer rubber layer is formed based on the compounding example A using silicate filler or based on the conventional compounding example. In the examples Z213 to Z 216, ranges of compounding of HAF carbon and conductive carbon are set to 10 to 20 parts by weight and 30 to 40 parts by weight, respectively.

Table 7 shows results of abrasion test to the belt back. In detail, a Tabor-type abrasion tester is used. In the test machine, a grinding disc (having a grindstone of Japanese Industrial Standard H-18) is rotated on the belt back at 2000 rpm with a load of 500 g applied to the belt back. Then, there are measured an abrasion amount of rubber and generation of stick to the pulley of the belt back. As is evident from the test results of Table 7, respective V-ribbed belts of this invention in which the outer rubber layers 10 are each formed based on the examples Z213 to Z216 generate no stick to the pulley but it is slightly greater in abrasion amount, as compared with the V-ribbed belt in which the outer rubber layer 10 is formed based on the conventional compounding example or the compounding example A. As a result, the V-ribbed belts of this invention have good abrasion resistance. In case that the abrasion amount is smaller and the stick generates, it is not judged that the abrasion resistance is good.

TABLE 6

| | | rubber compo. | | | | | | |
|---|---|---|---|---|---|---|---|---|
| | compounding | improved compounding examples of the present invention | | | | | | conventional ex. |
| | example A | Z211 | Z212 | Z213 | Z214 | Z215 | Z216 | by frictioning |
| FEF carbon (PHR) | 20 | — | — | — | — | — | — | 40 |
| silicate filler (PHR) | 30 | — | — | — | — | — | — | — |

TABLE 6-continued

| | rubber compo. | | | | | | | |
|---|---|---|---|---|---|---|---|---|
| | compounding | improved compounding examples of the present invention | | | | | | conventional ex. |
| | example A | Z211 | Z212 | Z213 | Z214 | Z215 | Z216 | by frictioning |
| HAF carbon (PHR) | — | — | 20 | 20 | 10 | 10 | 20 | — |
| conductive carbon (PHR) | — | 40 | 20 | 30 | 30 | 40 | 40 | — |
| electric resistance | | | | | | | | |
| surface resistivity | $8.25 \times 10^6$ $\Omega$ | $1.39 \times 10^4$ $\Omega$ | $4.63 \times 10^5$ $\Omega$ | $7.99 \times 10^3$ $\Omega$ | $1.56 \times 10^4$ $\Omega$ | $2.19 \times 10^4$ $\Omega$ | $1.85 \times 10^4$ $\Omega$ | $6.30 \times 10^6$ $\Omega$ |
| volume resistivity | $9.10 \times 10^7$ $\Omega \cdot cm$ | $9.02 \times 10^6$ $\Omega \cdot cm$ | $1.00 \times 10^6$ $\Omega \cdot cm$ | $3.95 \times 10^4$ $\Omega \cdot cm$ | $6.88 \times 10^4$ $\Omega \cdot cm$ | $3.87 \times 10^5$ $\Omega \cdot cm$ | $1.80 \times 10^5$ $\Omega \cdot cm$ | $5.25 \times 10^7$ $\Omega \cdot cm$ |
| | | | | | corresponding to Carbon amount of compounding example B | | | — |

TABLE 7

| | rubber compo. | | | | | | | |
|---|---|---|---|---|---|---|---|---|
| | compounding | improved compounding examples of the present invention | | | | | | conventional ex. |
| | example A | Z211 | Z212 | Z213 | Z214 | Z215 | Z216 | by frictioning |
| abrasion amount of the belt back after abrasion test | 0.014 cc | 0.123 cc | 0.088 cc | 0.068 cc | 0.115 cc | 0.073 cc | 0.062 cc | 0.045 cc |
| presence or absence of stick | presence of stick | absence of stick | | | | | | presence of stick |

Description is made below about examples of tests which are carried out on V-ribbed belts according to this invention.

V-ribbed belts of Examples 1–8 of this invention and V-ribbed belt of a conventional example are produced, and the respective V-ribbed belts are judged in relation to respective test items of electric resistance, adhesive strength between the layers of the covering canvas (unit:kg/cm), adhesive strength between the covering canvas and rubber (unit:kg/cm), an abrasion test of the belt back (method of measuring abrasion of the belt back on a table), transmission performance of the belt back, printability of mark to the belt back, and a general judgment. The test results is shown in Table 8. In Table 8, the adhesive strength between the layers of the covering canvas and the adhesive strength between the covering canvas and rubber are referred to as "adhesive strength: canvas-canvas" and "adhesive strength: canvas-rubber", respectively. The abrasion test and the transmission performance of the belt back is carried out in the following manners.

Figure 3:
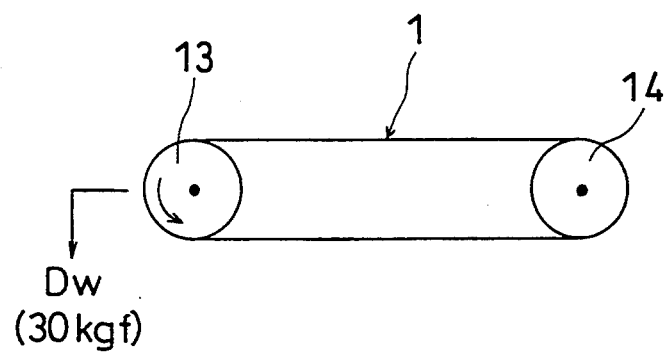
FIG. 3 is a diagram showing a layout of each pulley used for conducting an abrasion test of the back of the V-ribbed belt.

As for the abrasion test, as shown in FIG. 3, each of belts 1 of Examples 1–8 of this invention and the conventional example is looped between a driving pulley 13 and a driven pulley 14 which are flat pulleys of 100 mm diameter, and is run by rotating the driving pulley 13 at 3500 rpm with the driving pulley 13 loaded with deadweight of 30 kg. After set time has passed, the condition of the belt back is checked to judge generation of stick to the pulleys and the degree of abrasion.

Figure 4:
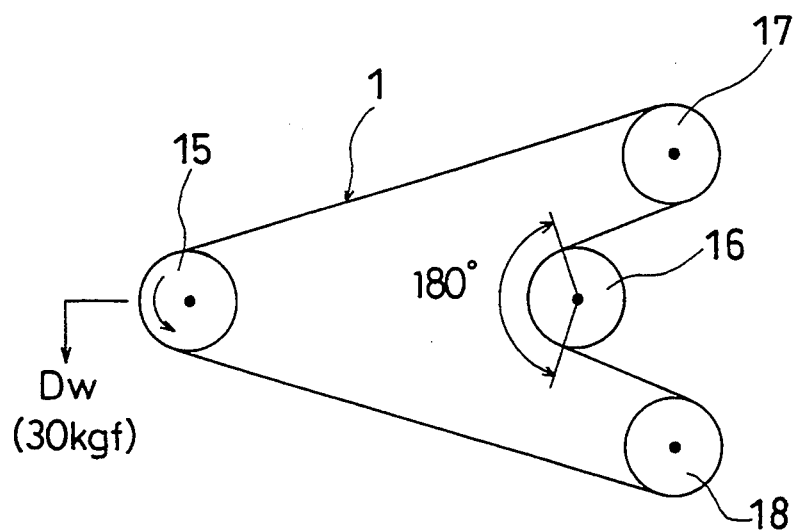
FIG. 4 is a diagram showing a layout of each pulley used for measuring transmission performance of the back of the V-ribbed belt.

As for the transmission performance, as shown in FIG. 4, each of belts 1 of Examples 1–8 of the present invention and the conventional example is looped over a driving pulley 15, a driven pulley 16 and idler pulleys 17, 18, and is run by rotating the driving pulley 16 at 3500 rpm with the driving pulley 16 loaded with deadweight of 30 kg. Then, metric horsepower PS of each belt 1 at 0.5 slipping is measured. All the pulleys 15–18 are flat pulleys of 100 mm diameter. A contact angle of the back of the belt 1 to the driven pulley 16 is 180°.

The V-ribbed belts 1 of the Examples 1–8 of this invention and the conventional example have the following structures.

Example 1

The canvas-rubber complex for covering the upper face of the tension belt of the V-ribbed belt is produced in the following manner. That is, a cotton fabric is used for the covering canvas. The canvas-rubber complex is formed by using a rubber composition of 30 g/m² according to the compounding example D as the impregnation rubber, a rubber composition of 16 g/m² according to the compounding example B as the outer rubber layer and a rubber composition of 111 g/m² according to the compounding example A as the inner rubber layer. Rubber cement as commonly used is applied to the inner rubber layer of the canvas-rubber complex. Then, and then the canvas-rubber complex is joined at the inner rubber layer to the upper face of the tension rubber of the V-ribbed belt and adhered thereto under set conditions of vulcanization.

Example 2

As in the case of Example 1, a cotton fabric is used for the covering canvas. The canvas-rubber complex is formed by using a rubber composition of 50 g/m² according to the compounding example D as the impregnation rubber, a rubber composition of 32 g/m² according to the compounding example B as the outer rubber layer and a rubber composition of 140 g/m² according to the compounding example A as the inner rubber layer. Rubber cement as commonly used is applied to the inner rubber layer of the canvas-rubber complex. Then, the canvas-rubber complex is Joined at the inner rubber layer to the upper face of the tension rubber of the V-ribbed belt and adhered thereto under set conditions of vulcanization.

Example 3

A cotton Fabric is used for the covering canvas. The canvas-rubber complex is formed by using a rubber composition of 64 g/m² according to the compounding example D as the impregnation rubber, a rubber composition of 48 g/m² according to the compounding example B as the outer rubber layer and a rubber composition of 165 g/m² according to the compounding example A as the inner rubber layer. Rubber cement as commonly used is applied to the inner rubber layer of the canvas-rubber complex. Then, the canvas-rubber complex is joined at the inner rubber layer to the upper face of the tension rubber of the V-ribbed belt and adhered thereto under set conditions of vulcanization.

Example 4

A cotton fabric is used for the covering canvas. The canvas-rubber complex is formed by using a rubber composition of 70 g/m² according to the compounding example D as the impregnation rubber, a rubber composition of 64 g/m² according to the compounding example B as the outer rubber layer and a rubber composition of 180 g/m² according to the compounding example A as the inner rubber layer. Rubber cement as commonly used is applied to the inner rubber layer of the canvas-rubber complex. Then, the canvas-rubber complex is joined at the inner rubber layer to the upper face of the tension rubber of the V-ribbed belt and adhered thereto under set conditions of vulcanization.

Example 5

A cotton fabric is used for the covering canvas. The canvas-rubber complex is formed by using a rubber composition of 32 g/m² according to the compounding example B as the impregnation rubber, a rubber composition of 16 g/m² according to the compounding example B as the outer rubber layer, a rubber composition of 14 g/m² according to the compounding example B as the inner rubber layer and a rubber composition of 110 g/m² according to the compounding example A as the adhesion rubber layer. Then, the obtained canvas-rubber complex is Joined at the inner rubber layer to the upper face of the tension rubber of the V-ribbed belt and adhered thereto under set conditions of vulcanization.

Example 6

A cotton fabric is used for the covering canvas. The canvas-rubber complex is formed by using a rubber composition of 49 g/m² according to the compounding example B as the impregnation rubber, a rubber composition of 33 g/m² according to the compounding example B as the outer rubber layer, a rubber composition of 30 g/m² according to the compounding example B as the inner rubber layer and a rubber composition of 135 g/m² according to the compounding example A as the adhesion rubber layer. Then, the obtained canvas-rubber complex is joined at the inner rubber layer to the upper face of the tension rubber of the V-ribbed belt and adhered thereto under set conditions of vulcanization.

Example 7

A cotton fabric is used for the covering canvas. The canvas-rubber complex is formed by using a rubber composition of 65 g/m² according to the compounding example B as the impregnation rubber, a rubber composition of 45 g/m² according to the compounding example B as the outer rubber layer, a rubber composition of 44 g/m² according to the compounding example B as the inner rubber layer and a rubber composition of 164 g/m² according to the compounding example A as the adhesion rubber layer. Then, the obtained canvas-rubber complex is joined at the inner rubber layer to the upper face of the tension rubber of the V-ribbed belt and adhered thereto under set conditions of vulcanization.

Example 8

A cotton fabric is used for the covering canvas. The canvas-rubber complex is formed by using a rubber composition of 71 g/m² according to the compounding example B as the impregnation rubber, a rubber composition of 65 g/m² according to the compounding example B as the outer rubber layer, a rubber composition of 60 g/m² according to the compounding example B as the inner rubber layer and a rubber composition of 181 g/m² according to the compounding example A as the adhesion rubber layer. Then, the obtained canvas-rubber complex is joined at the inner rubber layer to the upper face of the tension rubber of the V-ribbed belt and adhered thereto under set conditions of vulcanization.

Conventional Example

The canvas-rubber complex is produced in the following manner. A cotton fabric is used for the covering canvas. The canvas-rubber complex is formed by using a rubber composition of 52 to 78 g/m² according to the conventional compounding example as the outer rubber layer and the same rubber composition of 182 to 208 g/m² as the inner rubber layer. Rubber cement as commonly used is applied to the inner rubber layer of the canvas-rubber complex. Then, the canvas-rubber complex is joined at the inner rubber layer to the upper face of the tension rubber of the V-ribbed belt and adhered thereto under set conditions of vulcanization. The impregnation rubber is not used in the conventional example.

As is evident from the test results of Table 8, the Examples 1–8 of this invention have excellent abrasion resistance, as compared with the conventional example.

TABLE 8

| | | sample | | | | | | | |
|---|---|---|---|---|---|---|---|---|---|
| | convention- al ex. (by | Examples of the present invention | | | | | | | |
| test item | frictioning) | 1 | 2 | 3 | 4 | 5 | 6 | 7 | 8 |
| elec. resistance (MΩ) | 2–4 | 0.1–0.06 | 0.1–0.06 | 0.1–0.05 | 0.09–0.04 | 0.08–0.06 | 0.08–0.04 | 0.08–0.04 | 0.08–0.04 |
| adhesive strength canvas-canvas | 2.5–3.5 | 4.0–5.5 | 4.8–5.8 | 5.0–5.9 | 5.5–6.0 | 4.0–5.5 | 4.1–5.6 | 4.1–5.7 | 4.0–6.0 |
| adhesive strength canvas-rubber | 3.0–3.8 | perfect adhesion → canvas break | perfect adhesion → canvas break | perfect adhesion → canvas break | perfect adhesion → canvas break | 4.5–6.5 | 4.5–6.5 | 4.5–6.5 | 4.5–6.5 |
| abrasion test | particles stick in the form of 0.4–0.5 mm lump | no abrasion | no abrasion | no abrasion | abrasion generates, but no particles stick | no abrasion | no abrasion | no abrasion | abrasion generates, no particles stick |
| transmission | 4.0 PS | 3.8 PS | 3.7 PS | 3.5 PS | 3.7 PS | 3.7 PS | 3.8 PS | 3.6 PS | 3.5 PS |

TABLE 8-continued

| test item | conventional ex. (by frictioning) | Examples of the present invention | | | | | | | |
| --- | --- | --- | --- | --- | --- | --- | --- | --- | --- |
| | | 1 | 2 | 3 | 4 | 5 | 6 | 7 | 8 |
| performance at 0.5% slipping printability of mark | clear | presence of slightly unclear portion | clear | clear | clear | clear | clear | clear | clear |
| general judgment | bad | good | very good | very good | somewhat bad | very good | very good | very good | somewhat bad |

We claim:

1. A canvas-rubber complex forming a back of a V-ribbed belt, comprising:
    a covering canvas;
    impregnation rubber with which the covering canvas is impregnated;
    an outer rubber layer which is applied to a first face of the covering canvas which is located at the back face's side of the V-ribbed belt;
    an inner rubber layer which is applied to a second face of the covering canvas which is the back of the first face; and
    an adhesion rubber layer provided on the inner rubber layer for adhering the canvas-rubber complex to an upper face of a tension rubber of the V-ribbed belt,
    wherein, among the rubber elements excepting the adhesion rubber layer, at least the outer rubber layer is formed of a rubber composition having high abrasion resistance and conductivity.

2. The canvas-rubber complex according to claim 1, wherein the outer rubber layer is formed of a rubber composition including as main ingredients thereof CR polymer, hard carbon and conductive carbon.

3. The canvas-rubber complex according to claim 1, wherein each of the outer rubber layer, the inner rubber layer and the impregnation rubber is formed of a rubber composition including as main ingredients thereof CR polymer, hard carbon and conductive carbon, and
    the adhesion rubber layer is formed of a rubber composition including as main ingredients thereof CR polymer, soft carbon and silicate filler.

4. The canvas-rubber complex according to claim 1, wherein the outer rubber layer is formed of a rubber composition including as main ingredients thereof CR polymer, hard carbon and conductive carbon,
    the impregnation rubber is formed of a rubber composition including as main ingredients thereof CR polymer and silicate filler, and
    each of the inner rubber layer and the adhesion rubber layer is formed of a rubber composition including as main ingredients thereof CR polymer, soft carbon and silicate filler.

5. A V-ribbed belt which has: a tension rubber; a compression rubber; and tension members which are arranged between the tension rubber and the compression rubber so as to extend in a longitudinal direction of the belt and fixed to the tension rubber and the compression rubber by adhesion rubber, the compression rubber having a plurality of grooves in the form of V in section which extend in a longitudinal direction of the belt, the tension rubber being covered at an upper face thereof with a canvas-rubber complex,
    the canvas-rubber complex comprising:
    a covering canvas;
    impregnation rubber with which the covering canvas is impregnated;
    an outer rubber layer which is applied to a first face of the covering canvas which is located on the back face's side of the V-ribbed belt;
    an inner rubber layer which is applied to a second face of the covering canvas which is the back of the first face; and
    an adhesion rubber layer provided on the inner rubber layer for adhering the canvas-rubber complex to an upper face of a tension rubber of the V-ribbed belt, and
    among the rubber elements excepting the adhesion rubber layer, at least the outer rubber layer being formed of a rubber composition having high abrasion resistance and conductivity.

6. The V-ribbed belt according to claim 5, wherein the outer rubber layer is formed of a rubber composition including as main ingredients thereof CR polymer, hard carbon and conductive carbon.

7. The V-ribbed belt according to claim 5, wherein each of the outer rubber layer, the inner rubber layer and the impregnation rubber is formed of a rubber composition including as main ingredients thereof CR polymer, hard carbon and conductive carbon, and
    the adhesion rubber layer is formed of a rubber composition including as main ingredients thereof CR polymer, soft carbon and silicate filler.

8. The V-ribbed belt according to claim 5, wherein the outer rubber layer is formed of a rubber composition including as main ingredients thereof CR polymer, hard carbon and conductive carbon,
    the impregnation rubber is formed of a rubber composition including as main ingredients thereof CR polymer and silicate filler, and
    each of the inner rubber layer and the adhesion rubber layer is formed of a rubber composition including as main ingredients thereof CR polymer, soft carbon and silicate filler.

9. The V-ribbed belt according to claim 8, wherein the weight of the impregnation rubber is in a range from 32 to 64 g/m$^2$,
    the weight of the outer rubber layer is in a range from 16 to 48 g/m$^2$ and
    the total weight of the inner rubber layer and the adhesion rubber layer is in a range from 112 to 176 g/m$^2$.

* * * * *